June 23, 1936. H. A. LEVEY 2,045,328
ART OF PRODUCING CONTINUOUS FILM FROM PLASTIC MATERIAL
Filed Oct. 23, 1931 4 Sheets-Sheet 1

Inventor:
Harold A. Levey,

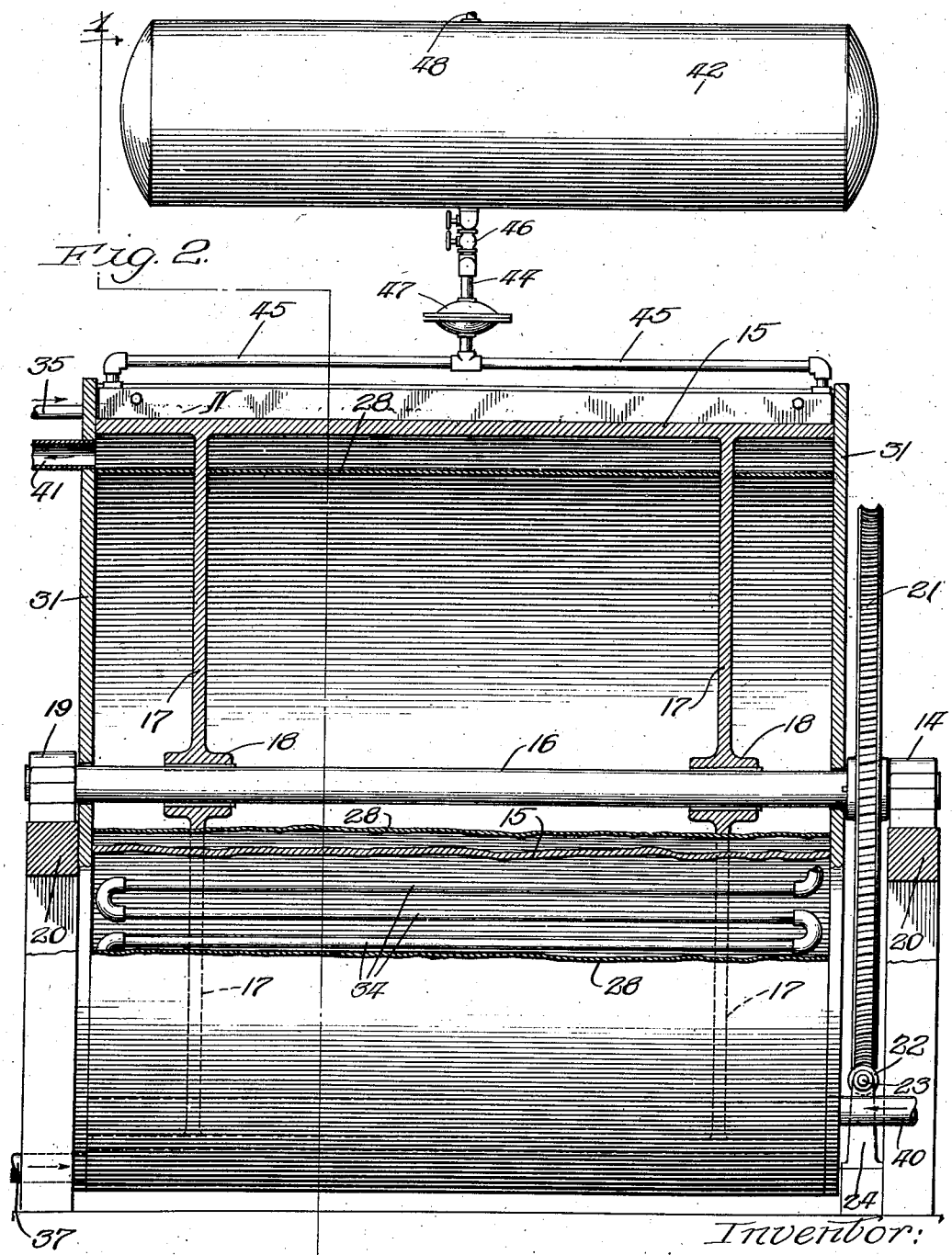

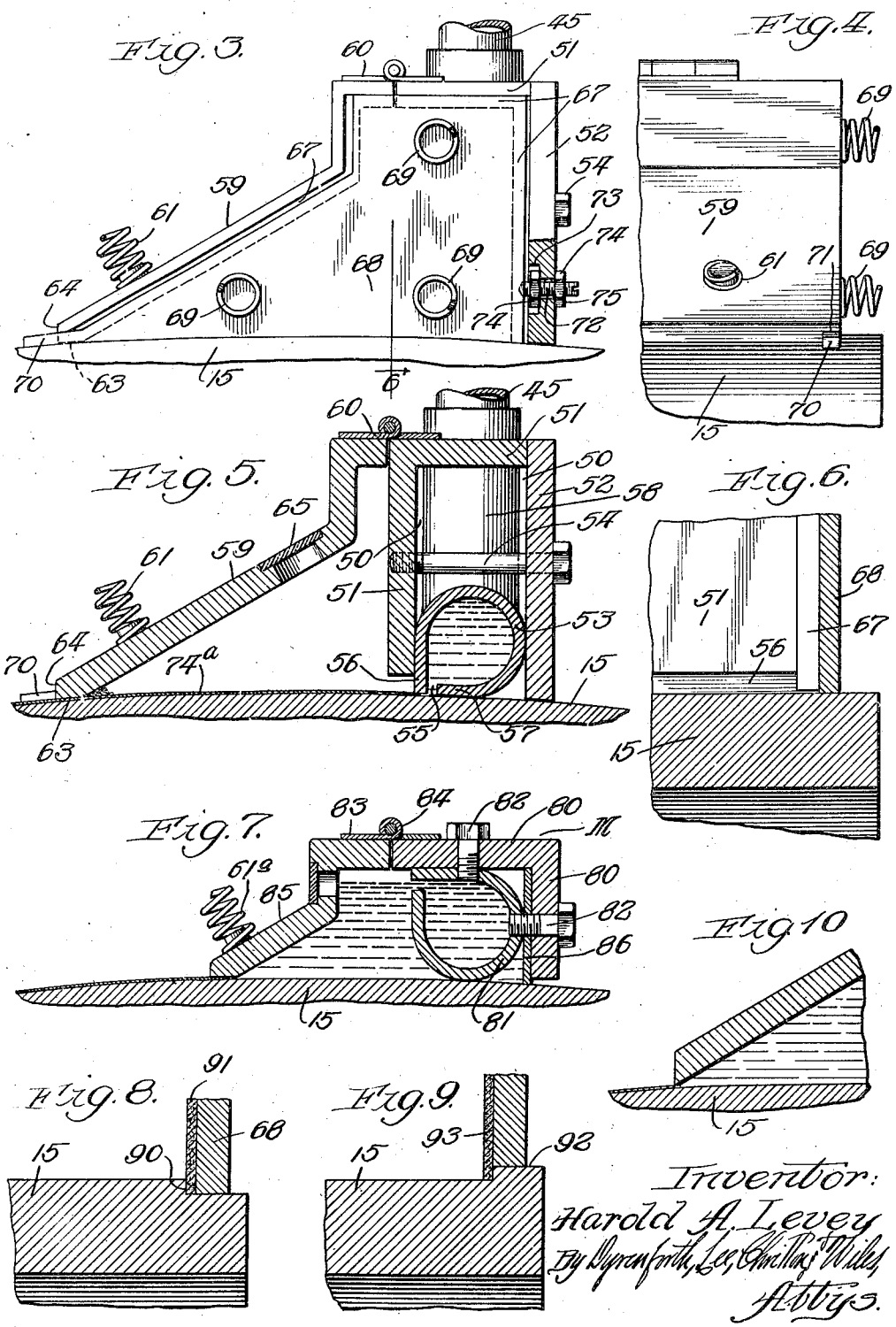

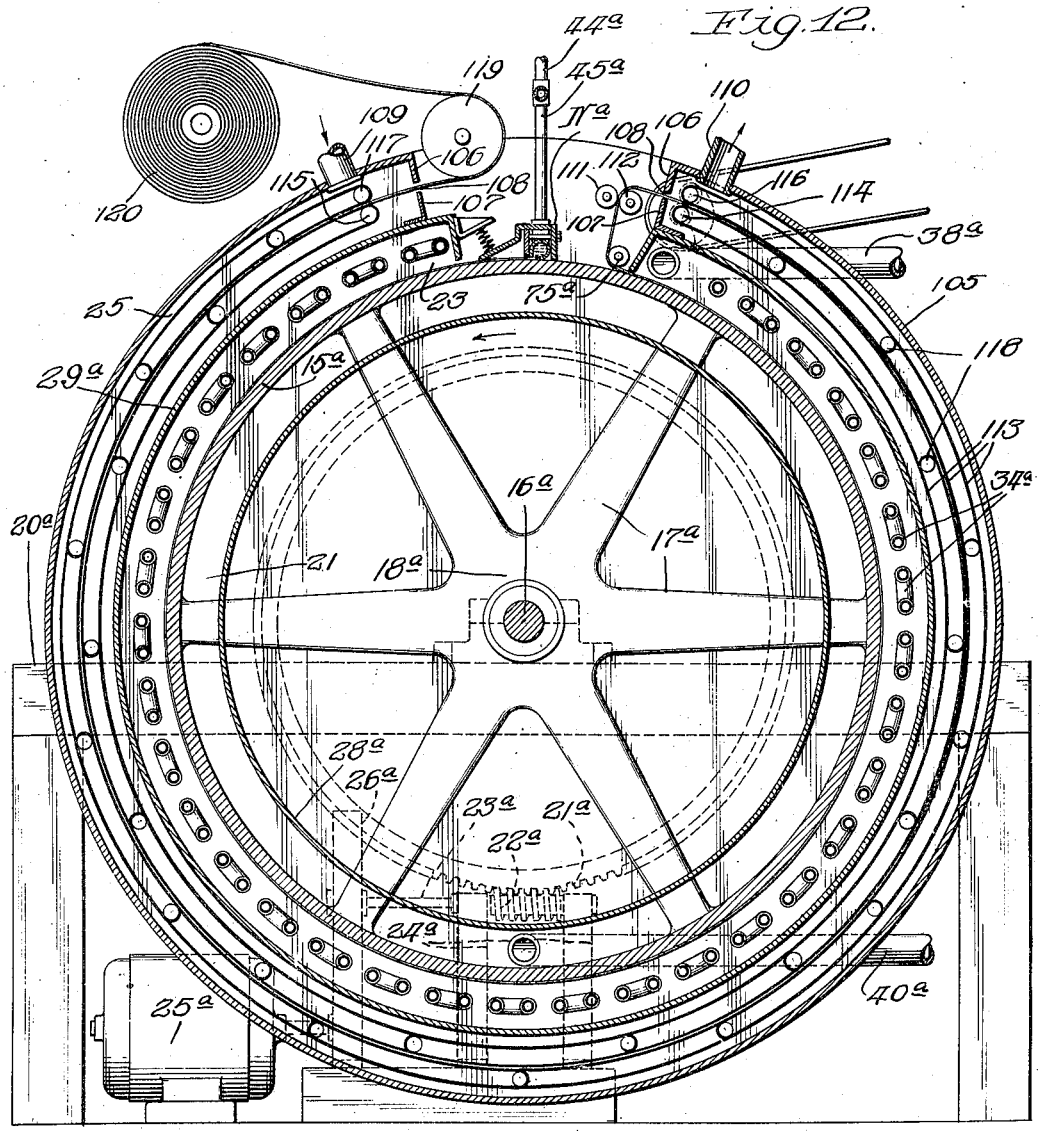
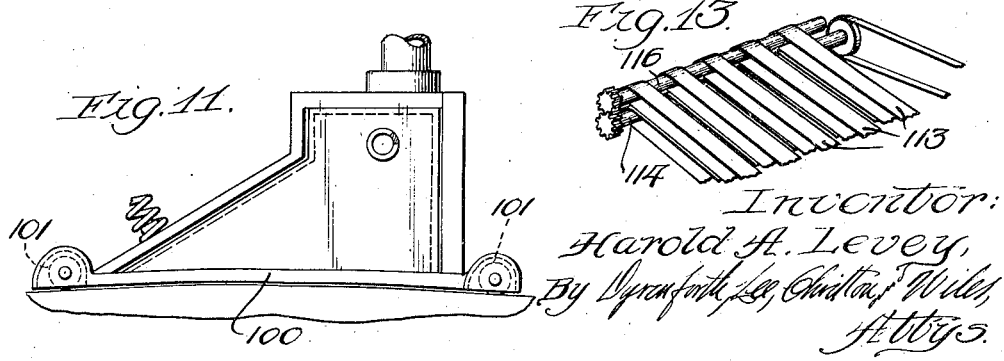

Patented June 23, 1936

2,045,328

UNITED STATES PATENT OFFICE 2,045,328

ART OF PRODUCING CONTINUOUS FILM FROM PLASTIC MATERIAL

Harold A. Levey, New Orleans, La.

Application October 23, 1931, Serial No. 570,727

12 Claims. (Cl. 18—15)

This invention relates to the production of sheets or films from various plastic materials and refers more particularly to a method and apparatus for the continuous conversion into film, of viscous solutions of plastic material and a more or less volatile solvent, for example, solutions of cellulose and cellulose derivatives, such as cellulose acetate, cellulose esters or ethers. The invention is also applicable to starch and starch derivatives, gelatin and gelatin solutions, resinous plastic solutions and the like.

The invention is particularly adapted for the continuous production of relatively thin films which are of substantially uniform quality, i. e. of uniform thickness, density, etc.

The invention will be fully understood from the following detailed description in conjunction with the accompanying drawings, in which:

Fig. 2 is a medial longitudinal sectional view of the apparatus shown in Fig. 1.

Fig. 3 is an end elevational view of a spreading or extruding nozzle for forming the plastic solution, in the form of a film, upon the surface on which it is hardened to produce the finished film.

Fig. 4 is a fragmentary front elevational view of one end of the nozzle shown in Fig. 3, taken on line 4 of Fig. 3.

Fig. 5 is a transverse sectional view of the nozzle shown in Fig. 3.

Fig. 6 is an enlarged fragmentary vertical longitudinal sectional view taken on line 6 of Fig. 3.

Fig. 7 is a transverse sectional view of a modified form of nozzle.

Figs. 8 and 9 are fragmentary sectional views showing different ways of affecting a close and leak-proof fit between the outer surface and the surface upon which the film is formed, and the end walls of the nozzle.

Fig. 10 is a fragmentary cross-sectional view of one form of film spreading blade, or bar.

Fig. 11 is a side elevational view of means for supporting the end wall of the nozzle upon the surface upon which the film of viscous material is cast.

Fig. 12 is a somewhat diagrammatic cross-sectional view of a modified form of apparatus; and Fig. 13 is an isometric view showing in detail suitable means for driving the film carrying belts.

Figure 1:
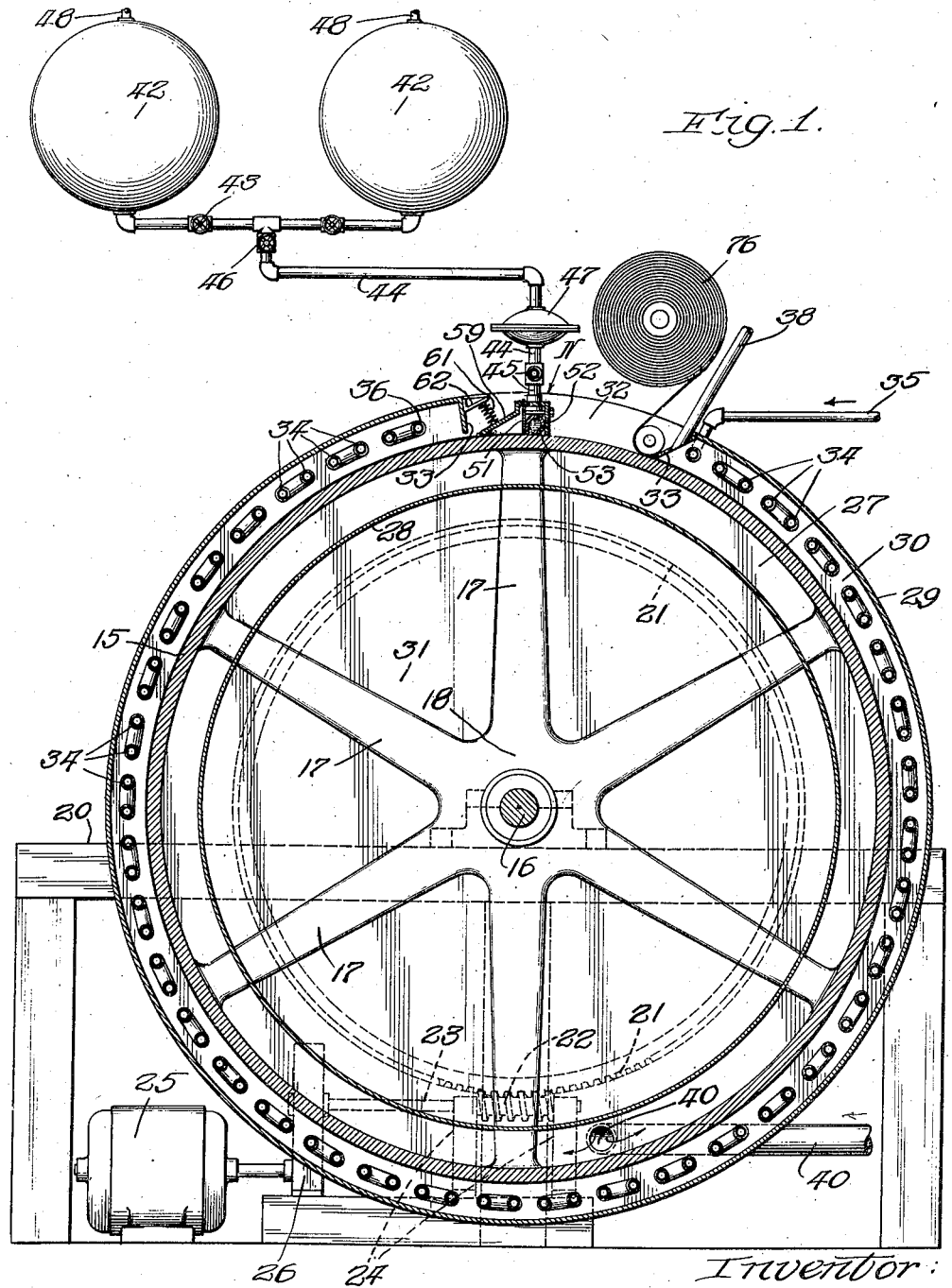
Fig. 1 is a somewhat diagrammatic elevational view, partly in cross-section, of an apparatus for producing film in accordance with the present invention.

Referring more in detail to the drawings, and more particularly to Figs. 1 and 2, the numeral 15 designates an enlarged cylindrical drum having a substantially true and unvarying cylindrical conformation. The drum 15 is horizontally disposed and is supported upon a shaft 16 by means of a plurality of spokes 17 adjacent each end thereof. The spokes 17 are preferably integrally secured to the inner wall of the drum and are keyed, or otherwise tightly secured, at their hubs 18 to the shaft 16. The shaft 16 is journalled in suitable bearings 19 mounted upon frame members 20 which are preferably disposed beyond the ends of the drum. The drum 15 may be rotated by the following means: An enlarged worm gear 21 is secured adjacent to one end of the shaft 16 and engages a worm 22 secured to a shaft 23 journaled in supports 24. The shaft 23 is rotated by suitable means, such as an electric motor 25 connected thereto by suitable gearing 26.

An annular chamber or space 27 is provided adjacent the inner wall of the drum 15 by means of a sheet metal cylinder 28 having a somewhat smaller exterior diameter than the interior diameter of the drum 15. The cylinder 28 is preferably coextensive with the drum 15 and is closely fitted or sealed to the spokes 17 to effect a substantially gas tight fit.

The entire drum 15 is enclosed within a cylindrical housing 29 having a somewhat greater interior diameter than the exterior diameter of the drum 15, the cylinder 29 being at all points spaced from the drum 15 to form an annular space or chamber 30 therebetween. The ends of the drum 15 and the annular spaces 27 and 30 are closed by means of a pair of circular disks or plates 31. The plates 31 are preferably tightly secured to the ends of the cylindrical housing 29 and closely abut the ends of the drum 15 and the interior cylinder 28. Thus, the drum 15 and the interior cylinder 28 are free to rotate within the closed cylindrical housing 29, the spaces 27 and 30 being kept out of communication with each other by the fact that the end plates 31 closely abut the ends of drum 15 and the internal cylinder 28.

A portion of the top side of the housing 29 is cut away to form a longitudinal slot or opening 32 (Fig. 1), and the resulting open ends of the space 30 are closed by means of strips 33 which depend from the edges of the wall of the cylinder 29 to a point just short of the surface of the drum 15. The space 30 contains suitable heating means, for example, a large number of serially connected lengths of pipe 34 may be mounted therein to form an elongated coil throughout the length of the chamber 30.

A hot fluid may be fed to the inlet end of the coil by means of a line 35, the spent heating fluid being discharged from the other end of the coil at 36.

A suitable preheated gas, such as air, is supplied to the annular space 30 at a point substantially removed from the upper ends thereof by means of a line 37, (Fig. 2), which passes through one of the end plates 31. The stream of gases so introduced through line 37 flows to the outlet line 38 connected to one end of the space 30. Preheated gas, such as air, may be supplied to the space 27, formed between the inner wall of the drum 15 and the cylinder 28. This air may be introduced through a line 40 which passes through one of the end plates 31. The spent gas may be removed from the space 27 through a line 41 leading through the other end plate 31. The gases so introduced may be preheated by any suitable heating means and forced through lines 37 and 40 by means of suitable blowers. It is preferred to connect the line 38 to the suction side of suitable blower means (not shown) whereby a pressure slightly below atmospheric may be maintained in the space 30.

A suitable film forming or extruding nozzle N is disposed in the slot or opening 32 provided in the upper portion of the cylindrical housing 29. In the embodiment shown in Figs. 1 and 2, the nozzle N is of a type adapted to extrude in film form upon the outer surface of the drum 15, a heavy viscous solution containing a relatively high percentage of solid matter. The nozzle N may be supported in any suitable manner, for example it may be carried by a frame (not shown) in such a manner as to permit it to be closely adjusted relative to the surface of the drum 15.

The viscous film forming solution is supplied to nozzle N from one or more tanks 42 through a manifold-line 43, a line 44, and into a manifold 45 leading to each end of the nozzle N. The line 44 is provided with a valve 46 and a filter 47. Each of the tanks 42 is provided with a line 48 leading from a source of compressed gas, such as air, which serves to force the viscous solution from the tanks 42 to the nozzle N.

Referring more in detail to Figs. 3, 4, 5 and 6, the nozzle N comprises an elongated rectangular chamber 50 open at its lower side which is preferably formed by a right angled plate 51 and a plate 52 abutting the upper side of the angled plate 51. A conduit 53 is mounted between the plates 51 and 52 and is firmly clamped between them by means of a plurality of bolts 54 distributed along the length of the nozzle. The conduit 53 extends longitudinally of the nozzle and is provided with a slot 55 along the lower side thereof. The forward wall 56 of the conduit 53 extends substantially perpendicular to the tangent of the face of the drum 15, while the lower side wall 57 thereof preferably extends substantially parallel to the tangent of the face of the drum, the slot 55 being defined by the inner side of the wall 56 and the edge or terminus of the wall 57. The lower edge of the plate 51 terminates a substantial distance short of the face of the drum 15, while the lower edge of the plate 53 almost contacts the face of the drum 15. The lower edge of the wall 56 of conduit 53 is preferably spaced a predetermined slight distance (for example .01 of an inch) from the face of the drum 15 while the lower side of wall 57 almost contacts the face of the drum 15. It will be apparent that the bolts 54, when loosened, permit the walls 56 and 57 to be accurately adjusted so as to produce the desired thickness of film. The entire nozzle assembly may be carried in a suitable frame (not shown) which may be vertically adjustable relative to the drum 15 by a suitable thread shaft, gearing, etc. The conduit 53 is connected at each of its ends with the manifold 45 by means of a pair of conduits, one of which is shown at 58 (Fig. 5).

An elongated plate 59 is pivotally secured to the upper end of the angle-plate 51 by means of one or more hinges 60. The plate 59 extends substantially the entire length of the nozzle N and is angularly disposed relative to a tangent of the drum 15. The plate 59 is of such a width that its lower edge is capable of touching the surface of the drum 15 a substantial distance away from the wall 56 of the conduit 53 (note Fig. 5). One or more compression springs 61 engage suitable lugs on the outer face of the plate 59 and thus tend to force the plate 59 against the surface of the drum 15. These springs 61 may be interposed between the plate 59 and suitable brackets 62 (Fig. 1) secured to the plates 33 on the housing 29. The lower edge 63 of the plate is beveled so that it presents a flat surface substantially parallel to a tangent to the drum 15 at such point. The outer side edge 64 is preferably substantially perpendicular to the tangent of the point of the drum directly below it. A number of windowed apertures 65 may be distributed along the plate 59.

It will thus be seen that the nozzle N contains two elongated spaces or chambers 50 and 66, the former being defined by the plates 51 and 52, and the latter being defined by the plates 59 and 51, and the surface of the drum 15. The ends of the nozzle N (and the spaces 50 and 66) may be closed by means of suitable removable plates 68. It is preferred to groove the inner sides of plates 59, the upper leg of plate 51, and plate 52, along their edges, to form grooves 67 into which may be fitted the plates 68. The plates 68 may be secured in any suitable manner, however it is preferred to provide a plurality of compression springs 69 which exert a substantial force against the outer side thereof at various points, (note Figs. 3 and 4). The plate 68 is thus forced into tight fitting relation with the shoulders formed by the grooves 67 on plates 59, 51 and 52. The lower edge of the plate 68 is preferably concavely curved on a radius corresponding to the radius of the drum 15, whereby its lower edge at all points closely fits against the surface of the drum 15. It is preferred to form the plate 68 of fibrous material.

While any suitable means may be employed for the purpose of maintaining the lower edge 63 of plate 59 in the desired spaced relation relative to the surface of the drum, it is preferred to employ the plate 68 as a means for so spacing the lower edge of plate 59. To this end the lower forward end of plate 68 may be provided with a protruding tapered foot 70 which extends through a notch 71 (Fig. 4) provided in the lower edge 63 adjacent the end plate 59, the lower edge of the foot 70 resting upon the surface of the drum 15. It will thus be seen that by extending or retracting the foot 70, the clearance of the edge 63 of plate 59 may be very closely regulated. In order to provide means for so regulating the position of the foot 70, the rear side edge of the plate 68 is provided with a threaded bore which receives a bolt 72 which extends through a vertical slot in plate 52. The inner side of plate 52 is provided with a counter-slot 73 which receives a nut 74, the slot 73 being only wide enough to permit the nut 74 to be moved vertically therein while preventing it from rotating. The bolt 72 engages the nut 74, and is provided with a nut 75 on the portion thereof which protrudes through the plate 52. By means of this particular structure plate 68 may be moved toward or away from the plate 52, thus extending or retracting the tapered foot 70 relative to the lower edge of plate 59 to accurately vary the spacing of the lower edge of the plate 52 relative to the surface of the drum 15.

In the operation of the device, a suitable solution of viscous material which upon evaporation of the liquid solvent admixed therewith assumes a hard plastic state, is supplied to the tanks 42. Such a solution may suitably comprise cellulose acetate and acetone, and may comprise as high as 30% by weight of solid matter, including cellulose acetate, resins, plasticizers, etc., however, it is to be understood that any suitable proportions of solvent and plastic material may be employed depending, of course, upon the materials used and the type of film to be produced. A suitable air pressure is maintained upon the body of material in the tanks 42 to cause the material to flow through lines 43, 44 and 45, the filter 47 and the conduit 53 in the nozzle N. It is preferred to use the tanks 42 alternately, thus fresh material may be supplied to one of the tanks 42, while the nozzle N is supplied with material from the other tank. In this way air, or other gas, which may be admixed with the viscous material, may be permitted to escape therefrom before the material is fed to the nozzle N. The flow of the material to the nozzle N may be closely controlled by the valve 46.

Prior to beginning the feed of the viscous material to the nozzle N, the drum 15 is warmed or heated to a suitable operating temperature. To this end, a suitable heated fluid, such as water, is circulated through the coil in the space 30, and a heated gas, such as air, is introduced to the chambers or spaces 30 and 27 by means of the lines 40 and 37. The spent gases are withdrawn from the chambers or spaces 30 and 27 through the lines 38 and 41. The clearance of the lower edges of the wall 56 and the blade 59 is carefully adjusted. The lower edge of the wall 56 is always spaced a substantially greater distance from the surface of the drum 15 than is the lower edge 63 of the spreading or forming plate 59. After the desired adjustments have been made, the rotation of the drum is begun. The drum as viewed in Figs. 1, 3, 5 and 7 is rotated in a counter-clockwise direction.

When the drum has reached the desired temperature, the valve 46 in line 44 is opened and the viscous material flows to the nozzle. The pressure maintained within the tanks 42 is sufficient to cause a comparatively even flow of the material to the nozzle N. The viscous material flows through the slot 55 and coats the surface of the drum 15, moving therepast. The lower edge of the wall 56 of the conduit functions to gauge the thickness of the layer of material applied to the drum. As the layer 23ª of material leaves the conduit 53 any entrained air or pockets of solvent vapor tend to rise to the surface thereof in the form of small bubbles. Also any solvent which becomes vaporized, because of the reduction of pressure, rises to the surface of the layer of viscous material. By the time the layer of material reaches the edge 63 of the blade 59 substantially all vapors and gases have either escaped therefrom, or have accumulated in the form of bubbles adjacent the upper surface thereof. As the viscous layer 73ª passes under the edge of blade 59 the upper portion thereof containing air or gas bubbles is prevented from passing therebeyond and the layer of material is reduced to the desired uniform thickness, the upper portion containing the bubbles accumulating along the inner side of the plate 59, as shown at 74ª.

It will be noted that the blade 59 is disposed at an acute angle relative to the layer of material advancing toward it from the conduit 53. This angular disposition of the blade I have found is extremely effective and forms a layer of material of substantially maximum density which is substantially free from variations in thickness and longitudinal lines or undulations even with the use of plastic solutions of high viscosity. While the angle of the blade 59 may vary depending upon various conditions of operation, the type of material treated, etc., I have found that the best results are secured when the angle of the blade 59 is not less than 25° nor more than 35° to a tangent projected on the surface of the drum 15 below the lower edge of the blade 59. Ordinarily, an angle of 30° will be found to give optimum results. Also, I have found that the outer or retiring edge 64 of the blade 59 should be substantially perpendicular to a tangent projected on the surface of the drum 15 at a point directly therebelow. However, comparatively satisfactory results may be obtained with a 5–10° variance to either side of the perpendicular.

The substantially even layer of material enters the space 30 wherein it is subjected to the body or atmosphere of warm gas therein which becomes heated by the coils 34. The layer of material is also warmed by the heat derived from the drum 15, the entire wall of the drum being warmed by the warm gas circulated along its inner side through the chamber 27. Under the influence of the heat and the warm gases, the solvent evaporates from the layer of viscous material, and by the time it approaches the other end of the space 30 it is substantially completely hardened into a dry film. It will be seen that the film of viscous material is first passed through a substantially quiescent body or atmosphere of warm gas, there being substantially no circulation of gas between the inlet 40 and the end of the space 30 at which the freshly cast film enters. As the film becomes somewhat dried, and consequently more firm, it reaches the zone of circulating gases, i. e., the portion of the space 30 between the inlet 37 and the outlet line 38. This constant stream of fresh gases passing over the partially dried film rapidly absorbs the solvent vapors and thus materially speeds the drying operation. The dry film is removed from the drum 15 after it passes the end of the heated chamber 30. In practice the film is threaded under a suitable roller 75 and is wound upon a suitable roll 76, as fast as it is formed.

The heat supplied to the rim of the drum by means of the warm gases passed along its inner surface, through the chamber 27, is at least sufficient to offset the cooling effect on the drum 15 by the evaporation of the solvent in the film or layer of viscous material undergoing drying thereon. Thus, the drum 15 is prevented from becoming chilled by the evaporation of the solvent and is maintained at the desired optimum temperature. The warm gases circulated around the exterior of the drum 15 through the chamber 30 not only function to directly heat the layer of viscous material, but, because of their elevated temperatures, causes a relatively rapid evaporation of the solvent contained in the layer. It is preferred to connect a suitable suction means to the outlet line 38 so that a pressure slightly below atmospheric may be maintained in the chamber 30. This reduced pressure not only aids evaporation of the solvent, but prevents any leakage of the evaporated solvent from the chamber 30, any leakage being that of air into the chamber 30. Thus loss of the solvent is avoided, and the evaporated solvent may all be passed to a suitable recovery operation.

The hot heating fluid flows through the coil 34 in a direction opposite to the direction of rotation of the drum 15. By means of the hot fluid flowing through the coil 34, the atmosphere of gas surrounding the drum may be maintained at substantially the optimum temperature, the cooling effect on the warm gases by the evaporating solvent being substantially entirely counteracted by the heat supplied to such gases by the countercurrently flowing heating fluid in the coil 34. By flowing the hot fluid through coil 34 in a direction counter to the direction of movement of the film through the space 30, the temperature of the warm atmosphere of gases to which the drying film is exposed, during its movement through the space 30, may be progressively higher in the direction of movement of the film. The hot fluid in coil 34 also functions to warm any cool air which leaks into the chamber 30 because of the reduced pressure therein. It will be seen that the coil 34 supplies sufficient heat to maintain the gases at the most effective optimum temperature throughout the chamber or space 30.

Thus, the gases introduced at 37 are at the optimum temperature relative to the state of the film at this point, and may be heated, if necessary, to a higher temperature as they progress toward the outlet 38 and the point of removal of the finished film. The air leaking between the plate 33 and the freshly deposited layer of plastic material, may be heated to the optimum temperature by the fluid in coil 34. It will be seen that by means of the coil 34 various temperature conditions may readily be maintained in the chamber 30. Thus the freshly applied layer of material may be subjected to a temperature sufficient to effect the most rapid evaporation of the solvent without deformation of the layer of material, and as the film progresses toward the point of removal from the drum 15, it may be subjected to increasingly higher temperatures.

While the nozzle N heretofore described may be employed for the extrusion of various types of plastic fluid upon a surface for the formation of a film, it is especially adapted for use in connection with extremely heavy or viscous fluids, for example, 500 second cellulose nitrate, or an equivalent solution of cellulose acetate consisting of as high as 30% solid matter, including the acetate, plasticizers, resins, stabilizers, etc. By means of this type of nozzle, films of a thickness of 1 mil. and upwards may be effectively produced from such viscous materials upon the drum 15.

In Fig. 7 I have illustrated a modified form of nozzle M wihch is adapted for use in connection with the formation of relatively thin films having a thickness of less than 1 mil. for example ½ mil., or 0.0005 inch.

For effecting the production of such relatively thin films I have found it desirable to employ less viscous solutions than those heretofore referred to in connection with the use of nozzle N. For example, in the production of film of ½ to 1 mil. in thickness from a solution of cellulose acetate and acetone, best results are secured when not more than 20% solid material is employed in the mixture, and preferably when not more than about 16% of solid material is employed in the mixture to be used.

The nozzle M shown in Fig. 7, like the nozzle N, is mounted over the top side of the drum 15, being carried in a suitable supporting frame 10 (not shown) and mounted therein for close vertical adjustment relative to the surface of the drum. This nozzle comprises a right angled plate 80 within which is carried a conduit 81. The latter is preferably secured by means of a plurality of cap-screws 82, which pass through the sides of the angular-plate 80 and engage threaded apertures formed in the conduit 81. The upper portion of the front wall of the conduit 81 is provided with an elongated slot 83. The conduit 81 is connected to the manifold 45 in a manner similar to the conduit 53 in nozzle N. The free end of the top leg of the plate 80 is connected by means of one or more hinges 84 with a forming plate 85. This plate may be of the same general structure as the plate 59 in nozzle N, and may be forced toward the drum 15 by one or more springs 61ª. The rear wall of the nozzle M may be sealed relative to the surface of the drum 15 by means of a soft fibre plate 86, which extends therebelow. The ends of the nozzle M may be closed by means of walls similar to the walls 68 of nozzle N, and similar means may be employed for spacing the lower edge of the blade 85 from the drum 15.

It will be noted that in the nozzle M the material is not applied to the drum 15 in a relatively thin layer which layer is reduced by the blade (as in nozzle N). Instead, the viscous material is maintained in a substantial body within the nozzle M and almost completely fills the interior thereof. It will be seen that entrapped air and solvent vapor bubbles work up to the upper portion of the body of material within the nozzle M, the lowermost portion of the body of the viscous material coating or "wetting" the drum 15 and being substantially free from air or vaporized solvent bubbles.

In Figs. 8 and 9 I have shown slightly modified outer surfaces for the drum 15. In Fig. 8 the outer portion of the drum is of reduced diameter to form a square shoulder or offset 90 against which the end wall 68 of the nozzle may fit. In the embodiment shown the end wall plate 68 is lined with a thin layer 91 of relatively soft fibrous material. In Fig. 9 the marginal portion of the drum 15 is raised as shown at 92. The lower edge of the end wall plate bears upon this portion 92. The inner side of the plate 68 carries a soft fibre plate 93 which extends therebelow and against the surface of the drum 15 within the raised marginal portion 92.

In Fig. 10 is shown a blade for distributing or forming the layer of fluid material to be formed into film. This plate is in general similar to the plates 59 and 85, but has an acute lower edge instead of a flattened one. This blade, like blades 59 and 85, is set at an angle of from 25-35° from a tangent to the surface of the drum below the edge thereof and its retiring edge (relative to the movement of a layer of material) is substantially perpendicular to such a tangent.

In Fig. 11 is shown a structure for supporting the end walls 68 of the nozzle upon the surface of the drum 15. The lower edge of the end wall plate 68 rests upon the top side of a frame member 100. The lower side of the frame 100 is arcuate, having a radius of curvature the same as that of the drum 15. This lower edge of frame 100 almost contacts the surface of the drum 15. The frame 100 is maintained in such relation to the drum 15 by means of a pair of hard steel wheels 101 secured to either end of the frame 100. These wheels support the entire weight of each end of the nozzle and because of their rolling action avoid substantial wear of the drum 15.

It will be understood that the outer surface of the drum 15 should be extremely smooth and of a true cylindrical conformation. Also, the outer surface of the drum as well as the parts of the nozzle, the tanks 92 and the various pipe lines, valves, filters, etc. which come into contact with the viscous material, to be formed into film, may be constructed of, or at least coated, with substances which are resistant to corrosion by such material. For example, nickel, Monel metal, silver and nickel-chrome iron alloys have been found to be resistant to cellulose acetate mixtures. It is preferable to maintain the mixture of material within close ranges of temperature during its passage to and through the film forming nozzle. Such temperatures may vary to a certain extent, depending, of course, upon the particular mixture of substances employed. For example, the afore-described cellulose acetate-acetone solution, containing 30% solid matter, should be maintained at about 100 to 120° F. during its flow to the nozzle.

Figs. 12 and 13 show an apparatus generally similar to that shown in Figs. 1–11 inclusive, which is provided with a secondary drying system for the film. In this embodiment, the film is removed from the rotary drum before it has entirely dried and is somewhat plastic and while in such condition it is suitably longitudinally drawn or stretched and thereafter completely dried in a warm atmosphere of gases. In order to simplify the description, the various parts of the apparatus of Figs. 12 and 13, which are similar to those shown in Figs. 1–11 inclusive, are designated by similar reference characters, the reference characters being differentiated from those in Figs. 1–11 in that they are suffixed by the letter "a". Referring more in detail to Figs. 12 and 13, and more particularly to the supplemental drying means and the lateral film tensioning and stretching means, the numeral 105 indicates a cylindrical housing which surrounds in spaced relation the housing 29ª enclosing the drum 15ª. The housing 105 is provided with suitable side walls (not shown) which are fitted between the exterior of housing 29ª and the housing 105 in a substantially leak-proof manner. The upper side of the housing 105 is cut away to form an elongated transverse slot or opening corresponding to the opening 32ª in the housing 29ª in which is located the feed nozzle Nª. The resulting open ends formed by this cutaway portion are closed by pairs of elongated strips or plates 106 and 107, each strip 106 depending from the housing 105 and each strip 107 extending upwardly from the exterior of the housing 29ª, the free edges of each pair of strips 106 and 107 being spaced apart to form a slot 108 through which a strip of film may be passed. One end of the housing 105 is connected to a conduit 109 leading from a suitable source of warm gases and the other end of the housing 105 is connected to an outlet conduit 110, whereby warm gases may be circulated through the housing 105 in a direction of flow corresponding to the direction of rotation of the drum 15ª. The conduit 110 may lead directly to the conduit 40ª whereby the warm gases from housing 105 may be passed to the space 30ª between housing 29ª and the drum 15ª, or the line 110 may lead directly to a suitable operation for recovering solvent vapors from the warm gases.

A pair of elongated rolls 111 and 112 are provided adjacent the point of removal of film from the drum 15ª, the rolls being adapted to engage between them the sheet or strip of film formed upon the drum 15ª. Either, or preferably both, of the rolls 111 and 112 are positively rotated by suitable mechanism (not shown) at such a speed that the velocity of their faces is substantially greater than the velocity of the face of the drum 15ª, for example, the surface velocity of the rolls 111 and 112 may be from ½ to 2% greater than that of the drum 15ª. The interior of the housing 105 is provided with suitable film conveying means, for example, a plurality of opposed endless cords or belts 113 may be provided therein. These belts or cords may suitably comprise two adjacent sets, one side of each loop of belting in one set of belts contacting one side of each belt loop of the other set. The belts 113 are looped over suitable rollers provided in the ends of the housing 105, rollers 114 and 115 engaging one set of belts 113 and rollers 116 and 117 engaging the other set of belts 113. The belts 113 are supported and guided intermediate the rollers 114, 115, 116 and 117 by a plurality of spaced idling rollers 118. The belts are preferably driven by suitable means (not shown) at a speed substantially equal to the surface speed or velocity of the tensioning or stretching rolls 111 and 112.

The operation of the device illustrated in Figs. 12 and 13 is substantially similar to that of the apparatus shown in Figs. 1–11. Thus, a layer or film of a viscous solution of cellulose acetate, or like material, is deposited upon the surface of the rotating drum 15ª by the nozzle Nª, the fresh film being carried first through the relatively quiescent zone of warm gases maintained in the space 30ª formed by the housing 29ª and then through the zone of circulating or flowing warm gases in the remaining portion of the space 30ª. The operation is so controlled that by the time the material reaches the end of the space 30ª it is partially dry, however it is desirable that the film be sufficiently dried that it possesses considerable strength and is not sticky or "tacky". The film is drawn as a continuous strip around the idling guide-roller 75ª by the tensioning or stretching rollers 111 and 112 between which it is fed. The film is elongated or stretched because of the differential of surface velocities between the rollers 111 and 112 and the drum 15ª.

The stretched film passes from between the rollers 111 and 112 through the slot 108 in the end of the housing 105 adjacent the rollers 111 and 112 and is carried through the housing 105 between the two sets of belts or cords 113. The film is passed from the other end of housing 105 through the slot 108 in the end wall over an idling guide roller 119 and thence to a suitable reel or spool 120 upon which it is wound. The hot gases flowing through housing 105 preferably flow in a direction counter to the direction of movement of the film therethrough and contact the film on both sides thereof to completely dry it. The stretching or elongating of the film before it has completely dried not only removes wrinkles and other similar irregularities in the film, but also improves the tensile strength of the film.

I claim:

1. In a device of the class described, a movable continuous smooth surface adapted to receive a coating of viscous film-forming material, means for moving said surface in a predetermined path of movement, a film forming blade associated with the said surface, said blade being inclined at an angle of from 25 to 30° relative to the said forming surface in a direction opposite the direction of movement of said forming surface, and means for applying viscous material to the surface of said forming surface, closely in advance of said film-forming blade.

2. In a device of the class described, a smooth surfaced forming member adapted to receive a coating of viscous material, a film forming blade closely beyond said forming member, means for moving said forming member past said blade, and means for applying viscous material to the said surface of said forming member at a point ahead of said blade, the side of said blade from which said forming member retires being within 5° of the perpendicular relative to the forming surface.

3. In a device of the class described, a smooth surfaced forming member adapted to receive a coating of viscous material, a film forming blade closely beyond said forming member means for moving said forming member past said blade, and means for applying viscous material to the said surface of said forming member at a point ahead of said blade, the side of said blade toward which said forming member approaches being inclined at an angle of 25 to 35° relative to said forming surface in a direction opposite to the direction of movement of said forming member and the side of said blade from which said forming member retires being within 5° of the perpendicular relative to the forming surface.

4. The method of producing continuous film from viscous material which comprises applying a layer of viscous material to the surface of one side of a forming member, passing said layer through a zone of heated inert quiescent gas, and then passing said layer through a second zone of heated inert gas, said last mentioned gas being moved in the direction of movement of said film, and being progressively heated to a higher temperature during its movement through said second zone.

5. The method of producing continuous film from viscous material which comprises applying a layer of viscous material to the surface of one side of a forming member, maintaining a heated zone along the opposite side of said forming member, and passing said layer through an independent zone of heated inert gas, said gas being moved in the direction of movement of said film, and being progressively heated to a higher temperature during its movement through said zone.

6. Apparatus for producing continuous film from viscous material which comprises a movable continuous forming surface, means for applying a layer of viscous material thereto, a compartment adapted to maintain a zone of heated quiescent gas, means for moving said surface therethrough, a second compartment adapted to maintain a zone of moving gas, means for moving said surface therethrough, means for moving gas therethrough in a direction of movement of said forming surface, means for progressively heating said gas to a higher temperature during its progress through said compartment, and means for removing said layer from said forming surface.

7. Apparatus as set forth in claim 6 in which said forming surface is independently heated on the side opposite that carrying the layer of viscous material.

8. Apparatus as set forth in claim 3, in which said film-forming blade has a flattened lower edge of substantial width and lying substantially in the plane of the surface of the drum.

9. The method of producing a very thin film from viscous material of the cellulose ester type which comprises applying a coating of such material to a forming surface, causing the coating of material to undergo drying upon said surface sufficient to free it from the surface, removing the resulting film from said forming surface before it has completely dried, and passing it through a zone of gases substantially warmer than the film in such manner that the gases contact both sides of the film, and wherein the film is uniformly dried upon both surfaces thereof, to produce a substantially completely dried non-curling film.

10. The method as set forth in claim 9 in which the partially dried film is longitudinally stretched.

11. An apparatus for forming a film from viscous material comprising a heated movable continuous film-forming surface, means for maintaining a liquid body of substantial thickness and width upon and in contact with the film-forming surface, and a film-forming blade in spaced relation to said forming surface and closely adjacent to said liquid body, the side of said forming member being inclined at an angle of 25 to 35 degrees from said film-forming surface and in a direction opposite to the direction of movement thereof, and the side of said blade from which said forming surface retires being within five degrees of perpendicular relative to said surface.

12. An apparatus for forming continuous films of viscous material comprising a continuous heated movable film-forming surface, means for supplying a layer of viscous material of uniform thickness at the time of application and substantially the width of the film to said film-forming surface, and a film-forming blade upon said surface spaced closely beyond said layer-supplying means in the direction of movement of said surface, the side of said blade toward which said forming member approaches being inclined at an angle of 25 to 35 degrees from said film-forming surface and in a direction opposite to the direction of movement thereof, and the side of said blade from which said forming surface retires being within five degrees of perpendicular relative to said surface.

HAROLD A. LEVEY.